1,970,437

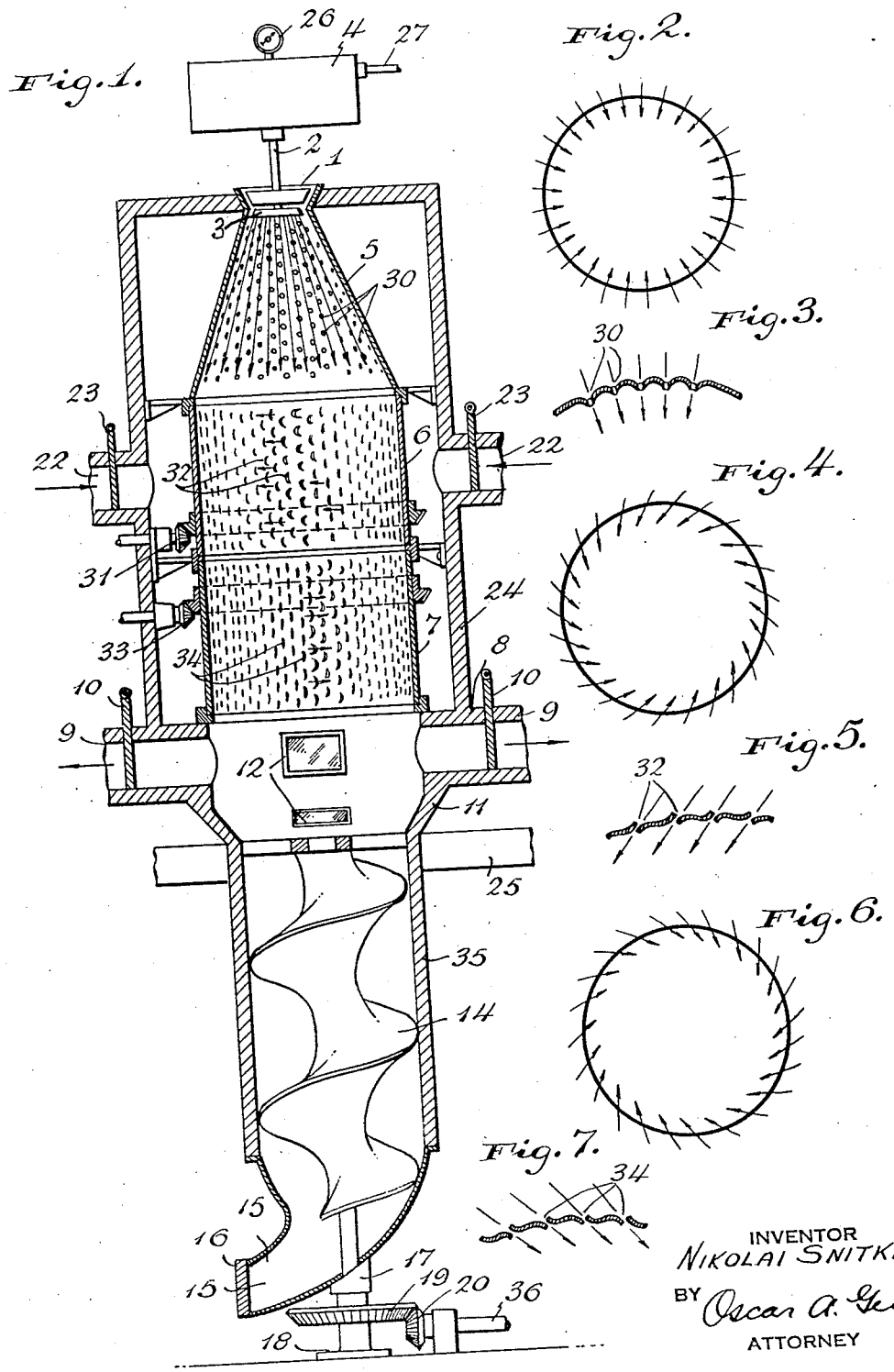
Aug. 14, 1934.   N. SNITKIN   1,970,437
METHOD OF AND APPARATUS FOR THE RAPID FREEZING OF LIQUIDS
Filed March 18, 1932
INVENTOR
NIKOLAI SNITKIN
BY Oscar A. Geier
ATTORNEY Patented Aug. 14, 1934

UNITED STATES PATENT OFFICE 1,970,437

METHOD OF AND APPARATUS FOR THE RAPID FREEZING OF LIQUIDS

Nikolai Snitkin, Tallinn, Estonia

Application March 18, 1932, Serial No. 599,788
In Estonia March 21, 1931

5 Claims. (Cl. 62—107)

The present invention relates to a method and means of freezing liquids rapidly.

Many liquids, particularly those of an organic origin, could not be preserved in their natural state, or after having been treated by some well known methods, without changing their taste and some of their physical and chemical properties.

An object of the present invention is the provision of a method of freezing liquids rapidly in such a way that they can be preserved in such a state and then thawed to form liquids which will retain their former taste and all their former physical and chemical properties.

The above and other objects of the present invention may be realized by subjecting a liquid in a finely sub-divided state to the action of a large quantity of jets of air, which are cooled to a great extent, and which pass through the liquid in different directions forming whirling currents therewith.

Due to this arrangement, the liquid freezes so rapidly that no chemical changes take place in this liquid, although these chemical changes are unavoidable if the liquid is frozen by the usual slow process.

The invention will appear more clearly from the following detailed description when taken in connection with the accompanying drawing showing a preferred embodiment of the inventive idea:

In the drawing:

Figure 1 is a vertical section through an apparatus used for freezing liquids rapidly.

Figures 2, 4 and 6 show diagrammatically the directions of the various jets of air formed in the apparatus shown in Figure 1.

Figures 3, 5 and 7 illustrate diagrammatically the perforations used for forming jets of air.

The device shown in Figure 1 comprises a lid 1 connected with a pipe 2 situated close to the atomizing device 3, which may be a shower bath, a Segner wheel, a pulverizer, a sprinkler or the like. The opposite end of the pipe 2 is connected with a receptacle 4, which contains the liquid and which is provided with an air gauge 26 and a pipe 27. The pipe 27 leads to an air pump, which is not shown in the drawing.

The pressure under which the liquid situated in the receptacle 4 is supplied to the atomizer 3 can be changed either by raising the level of the liquid in the receptacle 4 with respect to the atomizer 3 or by varying the pressure under which air may be introduced into the receptacle 4 through the pipe 27.

The temperature of the liquid supplied to the atomizer 3 must be close to its freezing point. A casing 5 has the shape of a frustum of a cone. This shape corresponds to the direction of the liquid leaving the atomizer 3, so that the pressure of the liquid in the casing 5 is lowered. The walls of the casing 5 are provided with perforations 30 shown in Figures 1 and 3.

A cylindrical casing 6 is situated under the casing 5 and may be rotated by a gear mechanism 31. The casing 6 is provided with perforations 32 shown in Figures 1 and 5.

A similar cylindrical casing 7 is situated under the cylindrical casing 6 and may be rotated by a gear mechanism 33. The casing 7 is provided with perforations 34 shown in Figures 1 and 7. The inner casings 5, 6 and 7 are surrounded by an outer immovable casing 24, which is connected with pipes 22. Filters 23 are situated within the path of the cooled air flowing through the pipes 22 to the interior of the casing 24.

The cooled air supplied under pressure to the interior of the casing 24 will reach the casing 5 and will flow into the interior of that casing through the perforations 30 forming a number of jets of air shown diagrammatically in Figure 2.

The air will also flow into the interior of the casing 6 through the perforations 32 and will form jets of air having the direction shown by arrows in Figure 4. Finally the air will flow through the perforations 34 of the casing 7 in the direction shown by arrows in Figure 6.

The casing 24 is carried by the casing 8, which is connected with pipes 9 serving as an exhaust for the air.

Filters 10 are situated in the path of the air leaving the casing 24 through the pipes 9.

The jets of air passing through perforations 30, 32 and 34 impart a whirlwind motion to the liquid ejected through the atomizer 3. Due to the fact that the jets of air passing through the perforations 32 have a different direction from those passing through the perforations 34, the liquid within the containers 6 and 7 will move in the form of a screw around the central axis of the containers 6 and 7 until it freezes in the form of flakes of snow and reaches a casing 11 having the shape of a frustum of a cone. Gear mechanisms 31 and 33 may be used to rotate the casings 6 and 7 and thus to increase the whirlwind motion of the apparatus, due to the provision of fins shown in Figures 3 and 7 and forming a part of the perforations 32 and 34.

Due to the fact that the air passes under pressure through the perforations 30, 32 and 34, the liquid or flakes of snow cannot leave the apparatus through these perforations.

The casings 8 and 11 are provided with openings 12 used for watching the process and for cleaning the apparatus.

The casing 11 is connected with a casing 35 carrying an Archimedian screw 14. The screw 14 is carried by a shaft 17 supported by a bearing 18. A conical wheel 19 is keyed onto the shaft 17 and meshes with a pinion 20, which is driven by a shaft 36. The shaft 36 is driven by a motor, which is not shown in the drawing. The screw 14 presses the frozen liquid downward until the liquid reaches the outlet 15. A detachable mold 16 is situated close to the outlet 15 so that the frozen liquid may be shaped in the form of blocks. These blocks may be further compressed by a press not shown in the drawing. The compressed air is supplied to the pipes 22 by an air pump connected to the refrigerator of the usual construction. It is preferably cooled by the usual refrigerating installation. These devices are not shown in the drawing. A support 25 may be used for carrying the casings 11 and 35 and for separating the upper portions of the apparatus from the lower portions.

The apparatus may be disposed vertically, horizontally or at any suitable angle of inclination.

I claim:

1. A method of freezing liquids, particularly those of an organic origin, comprising ejecting a liquid in a finely subdivided state and passing a plurality of jets of cooled air in different directions through said subdivided liquid, said liquid and said jets of cooled air forming a whirlwind motion during the last-mentioned step.

2. Apparatus for freezing liquids, particularly those of an organic origin, comprising a heat-insulated casing, a perforated receptacle within said casing, means for introducing a finely divided liquid into said receptacle and means for supplying a cooled air to said receptacle, said cooled air passing in the form of jets through perforations formed in said receptacle and moving in the form of a whirlwind within said receptacle.

3. Apparatus for freezing liquids, particularly those of an organic origin, comprising a heat-insulated casing, a perforated receptacle within said casing, the perforations formed in the walls of said receptacle forming a plurality of different angles with said walls, means for introducing a finely divided liquid into said receptacle, and means for passing cooled air into said receptacle through said perforations, said cooled air and said liquid forming whirlwinds moving in different directions within said receptacle.

4. Apparatus for freezing liquids, particularly those of an organic origin, comprising a heat insulated casing, a perforated receptacle within said casing, said receptacle comprising a plurality of movable portions; means for introducing a finely divided liquid into said receptacle, and means for supplying a cooled air to said receptacle, said cooled air passing in the form of jets through perforations formed in said receptacle and moving in the form of a whirlwind within said receptacle.

5. Apparatus for freezing liquids, particularly those of an organic origin, comprising a heat-insulated casing, a perforated receptacle within said casing, means for introducing a finely divided liquid into said receptacle, means for supplying a cooled air to said receptacle, and a screw adjacent to said receptacle for removing the frozen liquid.

NIKOLAI SNITKIN.